United States Patent [19]

Matsuo

[11] Patent Number: 4,871,241

[45] Date of Patent: Oct. 3, 1989

[54] COMPACT ZOOM LENS SYSTEM

[75] Inventor: Hirofumi Matsuo, Tokyo, Japan

[73] Assignee: Asahi Kogaku Kogyo Kabushiki Kaisha, Tokyo, Japan

[21] Appl. No.: 153,700

[22] Filed: Feb. 8, 1988

[30] Foreign Application Priority Data

Feb. 6, 1987 [JP] Japan .................................. 62-26788

[51] Int. Cl.$^4$ ............................................. G02B 15/14
[52] U.S. Cl. .................................................... 350/427
[58] Field of Search ................................. 350/423, 427

[56] References Cited

U.S. PATENT DOCUMENTS

| | | | |
|---|---|---|---|
| 4,395,092 | 7/1983 | Itoh | 350/427 |
| 4,468,098 | 8/1984 | Itoh | 350/427 |
| 4,740,063 | 4/1988 | Itoh et al. | 350/427 |

Primary Examiner—Scott J. Sugarman
Attorney, Agent, or Firm—Sughrue, Mion, Zinn, Macpeak & Seas

[57] ABSTRACT

A compact zoom lens system having a short overall length at the wide-angle position and which provides effective compensation for various aberrations. The lens system is composed of three lens units, and the overall length of the system is changed during zooming due to nonlinear movement of each lens units. From the object side, the first lens unit has a positive refractive power, the second lens unit negative refractive power, and the third lens unit a positive refractive power. The first lens unit is composed of a positive, a negative and a positive lens element, the second lens unit of two negative cemented lenses in each of which a negative lens element on the object side is cemented to a positive lens element, and the third unit composed of a front sub-unit having a positive lens element and a cemented positive lens in which a positive lens element on the object side is cemented to a negative lens element, an intermediate sub-unit consisting solely of a positive lens element, and a rear sub-unit consisting solely of a cemented negative meniscus lens in which a negative lens element on the object side is cemented to a positive lens element and which has a convex surface on the image side.

5 Claims, 8 Drawing Sheets

COMPACT ZOOM LENS SYSTEM

BACKGROUND OF THE INVENTION

The present invention relates to an imaging zoom lens system, and in particular to a compact zoom lens system of the three-unit type that has an F number range of about 1:4 to 1:5.6 and a viewing angle in an approximate range of ±6° to ±18°.

Prior art zoom lens systems that satisfy viewing angle and F number specifications of about ±6° to ±18° and about 1:4 to 1:5.6, respectively, are disclosed in Unexamined Published Japanese patent applications Nos. 12614/81 and 126819/81.

Each of these systems is generally referred to as a "four-unit type" zoom lens system, and the respective lens units responsible for four different functions, namely, focusing, zooming, compensation for defocusing, i.e., offset in focal point introduced as a result of zooming, and relaying of the image. This lens composition has the advantage that the overall lens length does not change during zooming since only the second and fourth units need to be moved to achieve zooming. On the other hand, this composition suffers from the disadvantage that, in order to shorten the overall lens length, the refractive powers of the individual lens units have to be increased, which results in less than satisfactory compensation for various aberrations.

SUMMARY OF THE INVENTION

An object, therefore, of the present invention is to provide a zoom lens system that is more compact and easier to use than prior art zoom lens system in that it has a shorter overall length at the wide-angle end.

Another object of the present invention is to provide a compact zoom lens system that is capable of more effective compensation for aberrations.

The above and other objects of the present invention are attained by a zoom lens system composed of three lens units and in which the overall length is changed during zooming due to nonlinear movement of each lens unit.

More specifically, a compact zoom lens system of the present invention comprises, in order from the object side, a first lens unit having a positive refractive power, a second lens unit having a negative refractive power, and a third lens unit having a positive refractive power. The first lens unit is composed of a negative, a negative and a positive lens element, which the second lens unit is composed of two cemented positive lenses in each of which a positive lens element on the object side is cemented to a negative lens element, and the third lens unit is composed of a front sub-unit having a positive lens element and a cemented positive lens in which a positive lens element on the object side is cemented to a negative lens element, an intermediate sub-unit consisting solely of a positive lens element, and a rear sub-unit consisting solely of a cemented negative meniscus lens in which a negative lens element on the object side is cemented to a positive lens element and which has a convex surface on the image side. This lens system further satisfies the following conditions:

$$1.3 < f_I/f_s < 1.5 \quad (1)$$

$$0.37 < |f_{II}|/f_s < 0.45 \quad (2)$$

$$0.4 < f_{III}/f_s < 0.5 \quad (3)$$

$$(\nu_1 + \nu_3)/2 > 70, \nu_2 < 40 \quad (4)$$

$$(n_4 + n_5 + n_6 + n_7)/4 > 1.73 \quad (5)$$

$$0.4 f_s < r_8 < 0.7 f_s \quad (6)$$

$$0.4 f_s < r_{11} < 0.6 f_s$$

$$0.6 < f_{III1}/f_{III1} < 0.8 \quad (7)$$

$$0.5 < f_{III}/f_{III2} < 0.7$$

$$0.1 f_s < d_{17} < 0.35 f_s \quad (8)$$

$$0.1 f_s < d_{19} < 0.35 f_s$$

where
 $f_s$: focal length of the overall system at the wide-angle end
 $f_I$: focal length of the first lens unit
 $f_{II}$: focal length of the second lens unit
 $f_{III}$: focal length of the third lens unit
 $\nu_i$: Abbe number of the ith lens element counted from the object side
 $n_i$: refractive index at the d line of an ith lens element counted from the object side
 $r_j$: radius of curvature of a jth lens element counted from the object side
 $f_{III1}$: focal length of the front sub-unit in the third lens unit
 $f_{III2}$: focal length of the intermediate sub-unit in the third lens group
 $d_j$: distance between a jth surface and a (j+1) surface as counted from the object side.

DESCRIPTION OF THE PREFERRED EMBODIMENTS

Figure 1:
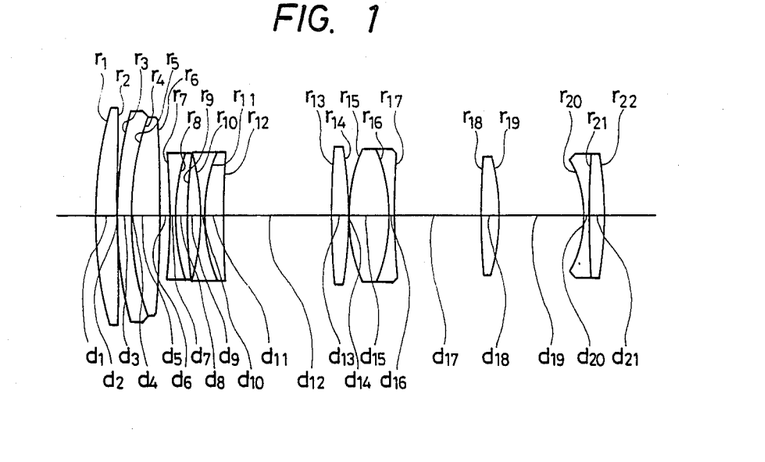
FIG. 1 is a simplified diagrammatic view of a lens system at the wide-angle end produced according to Example 1 below.
Figure 2:
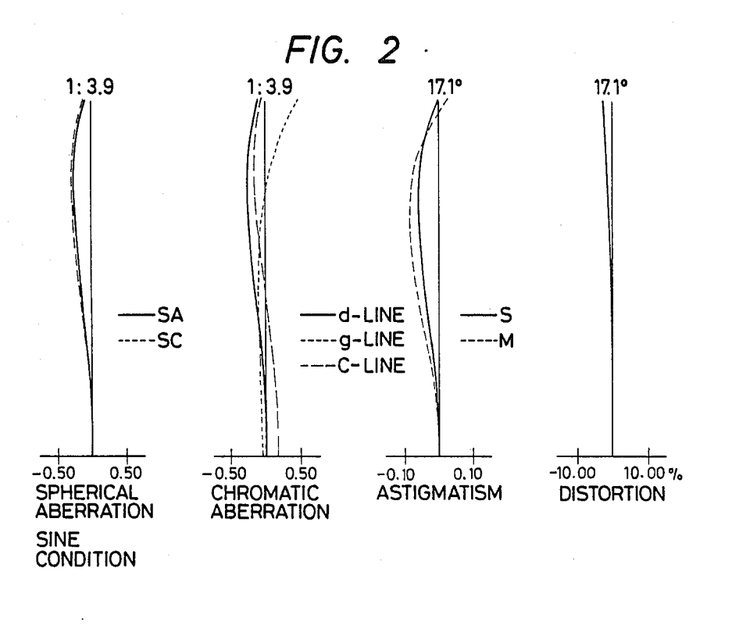
FIG. 2 is a graph showing aberrational curves obtained with the lens system of Example 1 at the wide-angle end.
Figure 3:
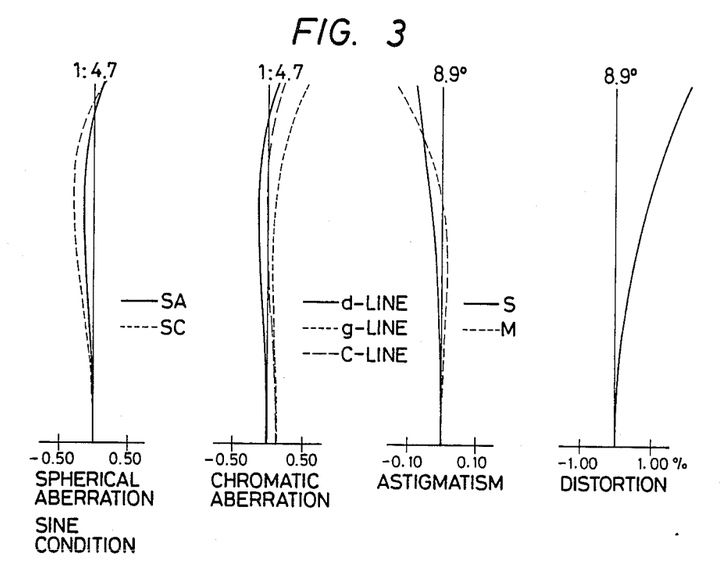
FIG. 3 is a graph showing aberrational curves obtained with the lens system of Example 1 at a middle-angle setting.
Figure 4:
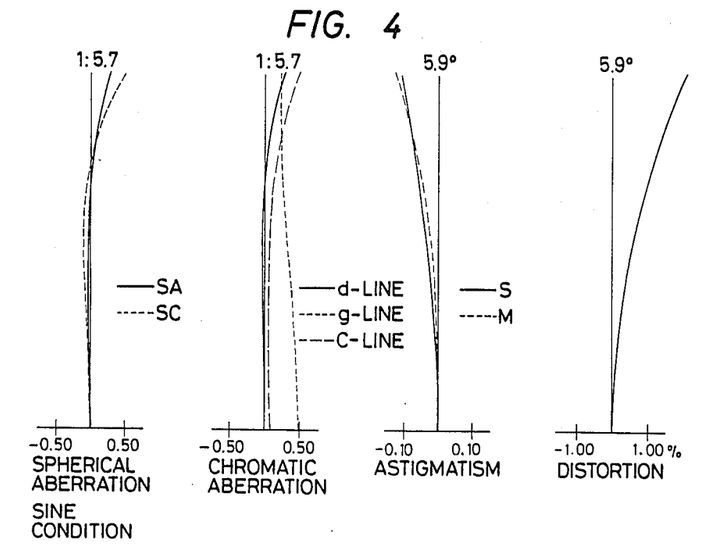
FIG. 4 is a graph showing aberrational curves obtained with the lens system of Example 1 at the narrow-angle end.
Figure 5:
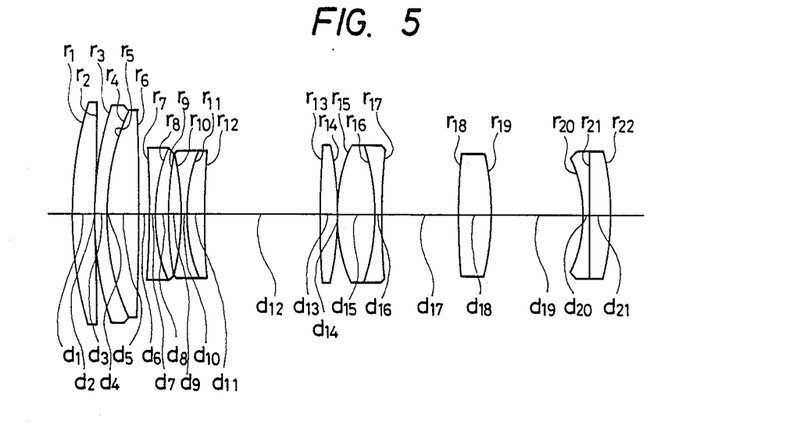
FIG. 5 is a simplified diagrammatic view of the lens system at the wide-angle end produced according to Example 2 below.
Figure 6:
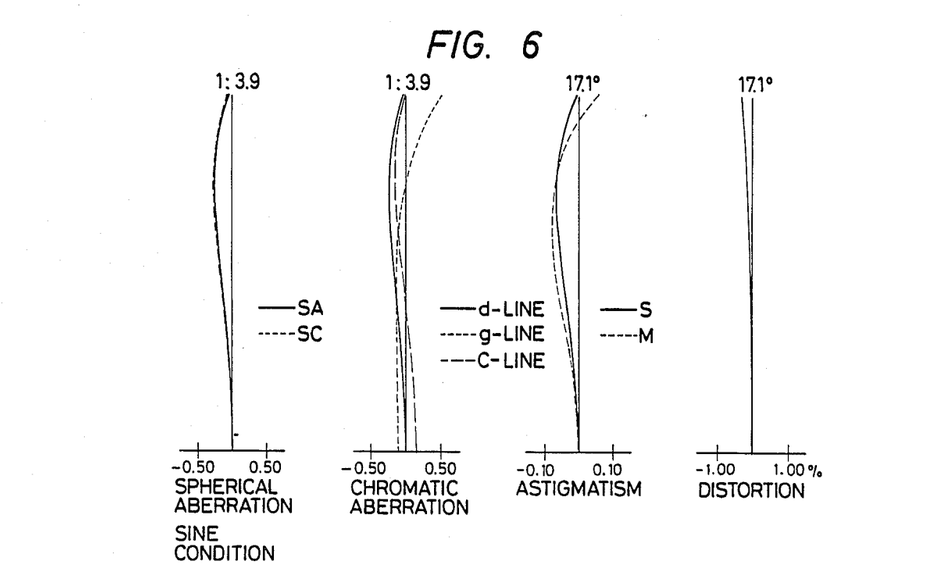
FIG. 6 is a graph showing aberrational curves obtained with the lens system of Example 2 at the wide-angle end.
Figure 7:
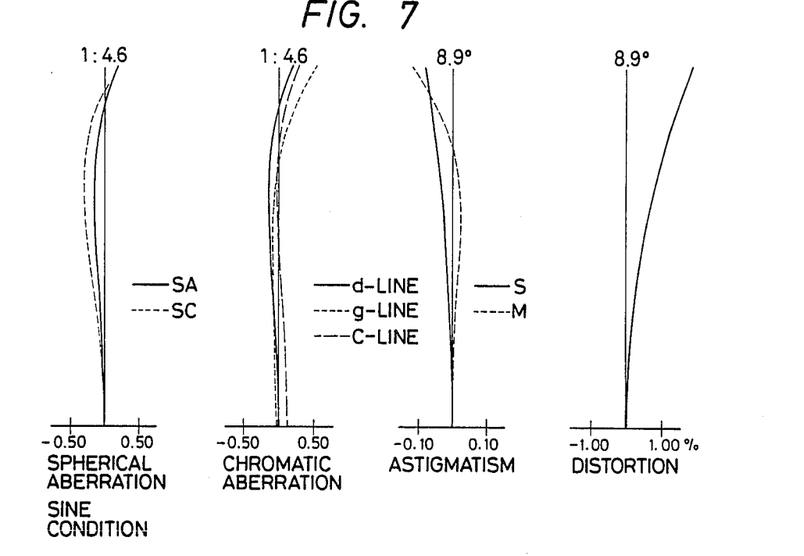
FIG. 7 is a graph showing aberrational curves obtained with the lens system of Example 2 at a middle-angle position.
Figure 8:
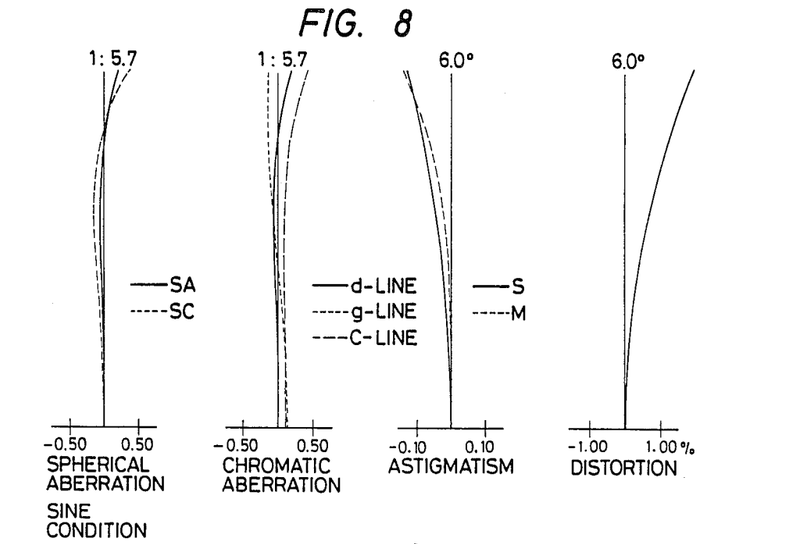
FIG. 8 is a graph showing aberrational curves obtained with the lens system of Example 2 at the narrow-angle end.
Figure 9:
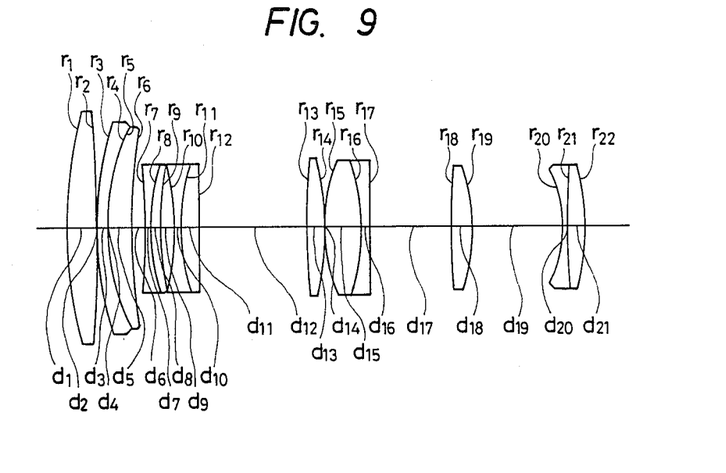
FIG. 9 is a simplified diagrammatic view of the lens system at the wide-angle end produced according to Example 3.
Figure 10:
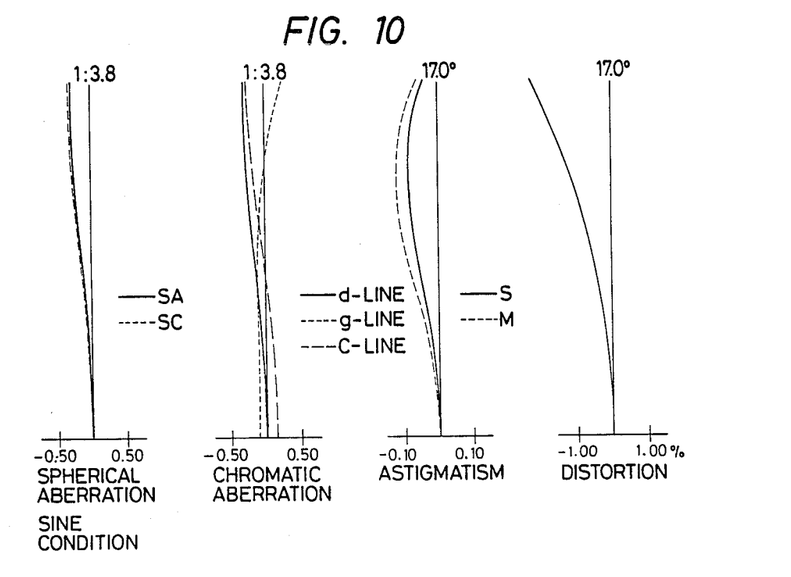
FIG. 10 is a graph showing aberrational curves obtained with the lens system of Example 3 at the wide-angle end.
Figure 11:
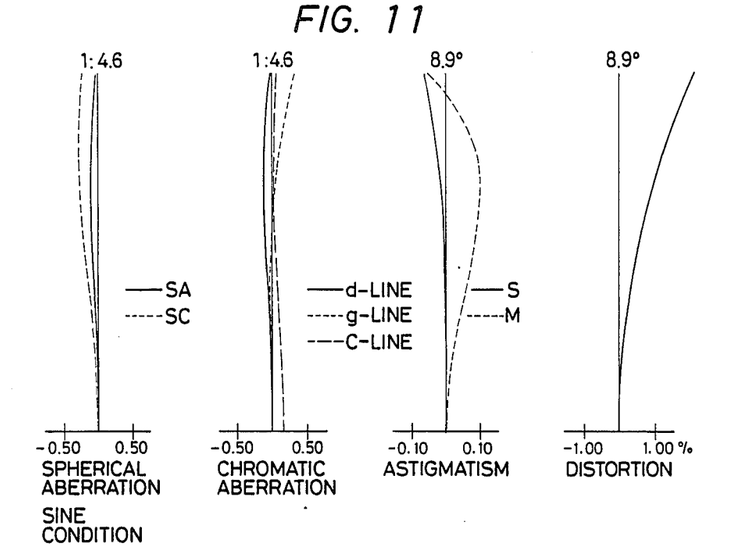
FIG. 11 is a graph showing aberrational curves obtained with the lens system of Example 3 at a middle-angle position.
Figure 12:
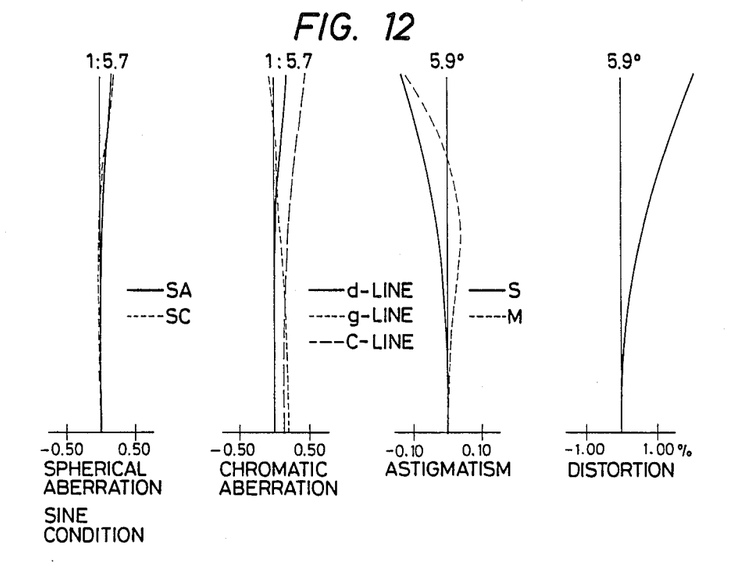
FIG. 12 is a graph showing aberrational curves obtained with the lens system of Example 3 at the narrow-angle end.
Figure 13:
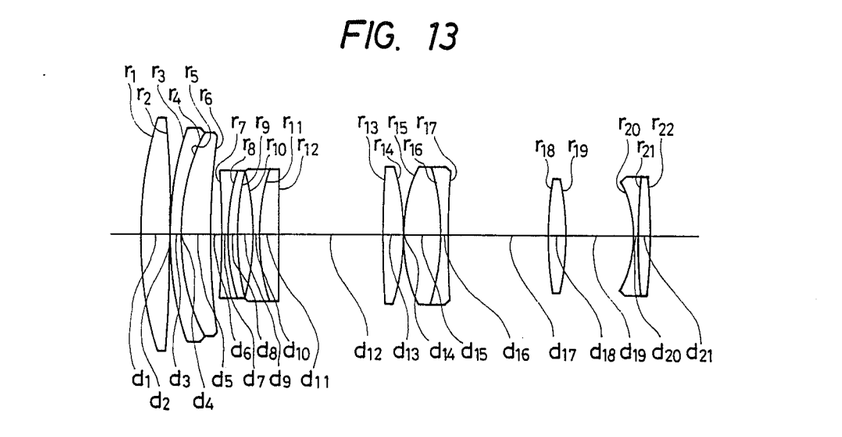
FIG. 13 is a simplified diagrammatic view of the lens system at the wide-angle end produced according to Example 4.
Figure 14:
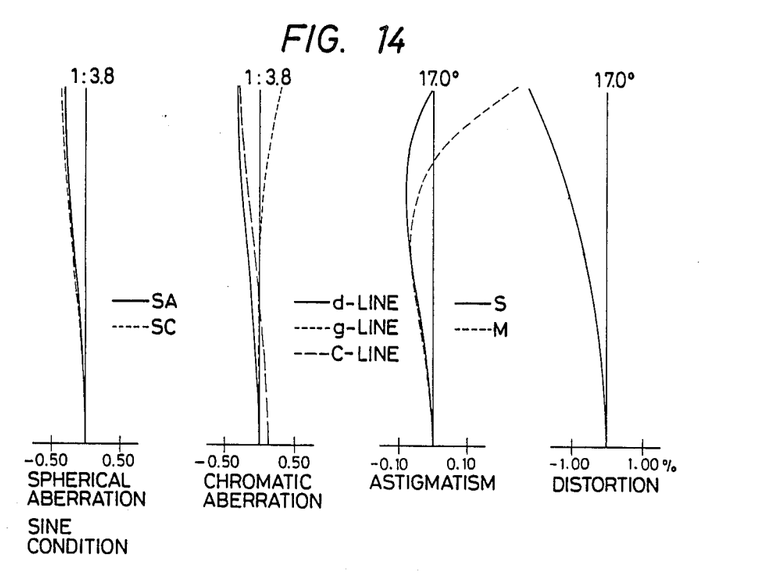
FIG. 14 is a graph showing aberrational curves obtained with the lens system of Example 4 at the wide-angle end.
Figure 15:
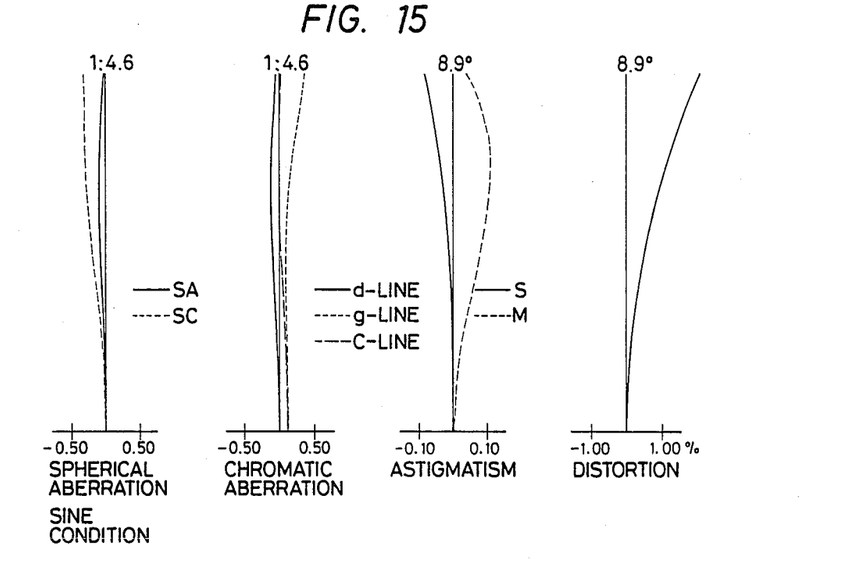
FIG. 15 is a graph showing aberrational curves obtained with the lens system of Example 4 at a middle-angle position.
Figure 16:
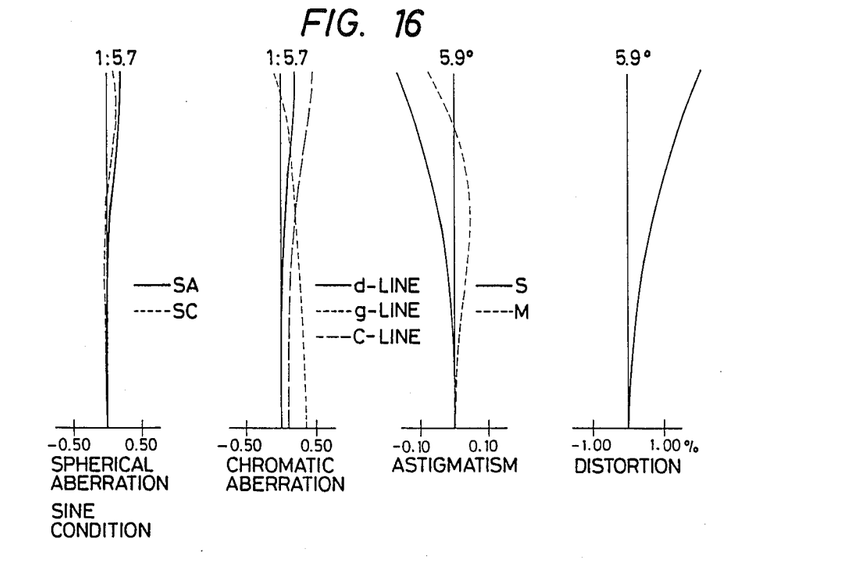
FIG. 16 is a graph showing aberrational curves obtained with the lens system of Example 4 at the narrow-angle end.

The criticality of each of the conditions (1) to (8) above will be described hereinafter.

Conditions (1) to (8) set forth the requirements for the distribution of the refractive powers of the first to third lens units which are the basic components of the lens system of the present invention. If the lower limits of these conditions are not reached, circumstances favorable for the purpose of providing a compact system are attained but, on the other hand, the refractive powers of the individual lens surfaces are increased to such an extent that aberrations of higher orders are highly likely to develop, making it difficult to achieve adequate aberrational compensation over the entire range of focal lengths. If the upper limits of conditions (1) to (3) are exceeded, the overall size of the system becomes too large to attain the objects of the present invention.

Condition (4) sets forth the mean average of the $\nu$ values of the positive lens elements in the first lens unit, as well as the $\nu$ value of the negative lens element in the first lens unit. A lens system as compact as the type contemplated by the present invention has the inherent disadvantage that an increased chromatic difference of magnification occurs at the narrow-angle end. In accordance with the present invention, this problem is solved by properly selecting an optical material that satisfies condition (4). If a further improvement in chromatic difference of magnification is desired, at least one of the two positive lens elements in the first lens unit can be made of an optical material having extraordinary partial dispersion as in the Examples discussed below.

Condition (5) sets forth the requirement for the mean average of the refractive indices of the lens elements of which the second lens unit is composed. Similar to the third lens unit, the second lens unit is capable of a zooming action, but since it is positioned between the first and third lens unit, its thickness must be decreased by minimizing the number of lens elements employed therein. Otherwise, a compact system cannot be attained. In accordance with the present invention, the mean average of the refractive indices of the lens elements in the second lens unit made comparatively high so as to permit the employment of four lens elements (positive, negative, positive and negative from the object side). In the conventional zoom lens system of the four unit type, the second lens unit is generally composed of three lens elements negative, negative and positive from the object side. If a similar three-element composition is adopted in a compact three-unit system of the type contemplated by the present invention, spherical aberrations that occur in the short-wavelength range of the spectrum are diffcult to compensate in a balanced way in the marginal portions (i.e., portions where incident rays of light encounter a lens surface at a large height) because such aberrations have a tendency to be overcompensated at the wide-angle end and undercompensated at the narrow-angle end. In accordance with the composition of the second lens unit employed in the present invention, condition (5) is satisfied and, at the same time, the two cemented surfaces are designed to have radii of curvature that satisfy condition (6). This ensures that the spherical aberrations that occur in the short-wavelength range of the spectrum are effectively compensated in a balanced way over the entire range of focal lengths.

Condition (7) sets forth the requirements to be satisfied by the third lens unit in terms of its composition. If compactness were the sole object to be attained, telephoto type lens system could be advantageously adopted in which a third lens unit has a refractive power on the object side rather than on the image side. However, unlike the four-unit type system, the lens system of the present invention depends not only on the first and second lens unit but also on the third unit for achieving zooming, making it is impractical to concentrate two much refractive power in the front and intermediate sub-unit in the third lens unit. In other words, if the refractive powers of these two sub-unit are reduced to such an extent that the lower limit of condition (7) is not reached, a compact system cannot be attained, and if their refractive powers are increased to such an extent that the upper limit of condition (7) is exceeded, excessive variations will occur in spherical aberrations as a result of zooming.

Condition (8) sets forth the requirements that should be met in combination with those of condition (7) in order to achieve effective compensation of chromatic difference of magnification over the entire range of focal lengths. If the intermediate sub-unit of the third lens unit is brought so close to the front sub-unit that $d_{17}$ becomes equal to or smaller than $0.1f_s$, undercompensation of spherical aberration occurs over the entire range of focal lengths and the negative refractive power of the rear sub-unit must be increased in order to achieve the necessary overcompensation by that sub-unit. However. this then causes overcompensation of chromatic difference of magnification. If the intermediate sub-unit is moved toward the rear sub-unit to such an extent that $d_{17}$ becomes equal to or greater than $0.35f_s$, overcompensation of spherical aberration occurs over the entire range of focal lengths, which cannot be compensated by the rear sub-unit without causing undercompensation of chromatic different of magnification. If $d_{19}$ becomes equal to or greater than $0.35f_s$, the necessary back focus cannot be assured. If $d_{19}$ becomes equal to or smaller than $0.1f_s$, not only does undercompensation of chromatic difference of magnification occur but also the back focus is increased too much to satisfy the requirement for compactness.

EXAMPLES

Data for Examples 1 to 4 of lens systems constructed according to the present invention are given in the tables below. In these tables, $F_{NO}$ is the F number, f is the focal length, $\omega$ is the half viewing angle, $f_B$ is the back focus, $r_j$ is the radius of curvature of the jth surface counted from the object side, $d_j$ is the distance between the jth surface and the (j+1) surface counted from the object side, $n_i$ is the refractive index at the d line of an ith lens element counted from the object side, $\nu_i$ is the Abbe number of the ith lens element counted from the object side, and $\Sigma_d$ is the overall lens length at the wide-angle end.

EXAMPLE 1

$F_{NO} = 1:3.9-4.7-5.7$
$f = 72.30-135.00-203.49$
$\omega = 17.1-8.9-5.9$
$f_B = 39.88-51.88-68.36$

| Surface No. | $r_j$ | $d_j$ | $n_i$ | $\nu_i$ |
|---|---|---|---|---|
| 1 | 80.080 | 4.59 | 1.48749 | 70.2 |
| 2 | 1080.030 | 0.10 | | |
| 3 | 85.000 | 2.20 | 1.80518 | 25.4 |
| 4 | 53.500 | 0.15 | | |
| 5 | 55.555 | 6.03 | 1.49700 | 81.6 |
| 6 | −533.185 | 2.00-20.86-26.67 | | |
| 7 | −146.228 | 1.28 | 1.77250 | 49.6 |
| 8 | 38.421 | 2.11 | 1.80518 | 25.4 |
| 9 | 68.597 | 2.56 | | |
| 10 | −50.310 | 1.28 | 1.74320 | 49.3 |
| 11 | 32.535 | 3.86 | 1.80518 | 25.4 |
| 12 | 267.123 | 21.39-8.92-0.69 | | |
| 13 | 132.321 | 3.60 | 1.74320 | 49.3 |
| 14 | −62.800 | 0.10 | | |
| 15 | 31.787 | 7.76 | 1.48749 | 70.2 |
| 16 | −35.190 | 1.29 | 1.80518 | 25.4 |
| 17 | 152.991 | 17.05 | | |
| 18 | 128.547 | 3.71 | 1.64769 | 33.8 |
| 19 | −47.616 | 17.29 | | |
| 20 | −23.000 | 1.20 | 1.78590 | 44.2 |
| 21 | 296.503 | 3.00 | 1.59270 | 35.3 |
| 22 | −60.960 | | | |

(1) $f_I/f_S = 1.394$
(2) $|f_{II}|/f_S = 0.417$
(3) $f_{III}/f_S = 0.459$
(4) $(\nu_1 + \nu_3)/2 = 75.9, \nu_2 = 25.4$
(5) $(n_4 + n_5 + n_6 + n_7)/4 = 1.782$
(6) $r_8 = 0.531 f_S$
　　$r_{11} = 0.450 f_S$
(7) $f_{III}/f_{III1} = 0.692$
　　$f_{III}/f_{III2} = 0.613$
(8) $d_{17} = 0.236 f_S$
　　$d_{19} = 0.239 f_S$
$\Sigma d + f_B = 142.43$

EXAMPLE 2

$F_{NO} = 1:3.9-4.6-5.7$
$f = 72.30-135.00-203.49$
$\omega = 17.1-8.9-6.0$
$f_B = 39.83-52.66-69.37$

| Surface No. | $r_j$ | $d_j$ | $n_i$ | $\nu_i$ |
|---|---|---|---|---|
| 1 | 79.747 | 4.68 | 1.51633 | 64.1 |
| 2 | 2653.075 | 0.10 | | |
| 3 | 86.590 | 2.20 | 1.80518 | 25.4 |
| 4 | 52.481 | 0.15 | | |
| 5 | 54.250 | 5.92 | 1.49700 | 81.6 |
| 6 | −834.174 | 2.20-19.98-25.73 | | |
| 7 | −152.136 | 1.28 | 1.69680 | 55.5 |
| 8 | 30.736 | 2.42 | 1.76182 | 26.6 |
| 9 | 58.137 | 2.73 | | |
| 10 | −50.300 | 1.28 | 1.74400 | 44.7 |
| 11 | 32.541 | 3.82 | 1.80518 | 25.4 |
| 12 | 249.746 | 22.86-9.53-0.74 | | |
| 13 | 139.013 | 3.60 | 1.71700 | 47.9 |
| 14 | −61.471 | 0.10 | | |
| 15 | 32.471 | 7.69 | 1.48749 | 70.2 |
| 16 | −35.678 | 1.28 | 1.80518 | 25.4 |
| 17 | 147.367 | 15.49 | | |
| 18 | 142.098 | 6.53 | 1.64769 | 33.8 |
| 19 | −48.220 | 18.32 | | |
| 20 | −23.741 | 1.20 | 1.78590 | 44.2 |
| 21 | 457.998 | 4.12 | 1.59270 | 35.3 |
| 22 | −54.776 | | | |

(1) $f_I/f_S = 1.383$
(2) $|f_{II}|/f_S = 0.421$
(3) $f_{III}/f_s = 0.483$
(4) $(\nu_1 + \nu_3)/2 = 72.85, \nu_2 = 25.4$
(5) $(n_4 + n_5 + n_6 + n_7)/4 = 1.752$
(6) $r_8 = 0.425 f_S$
　　$r_{11} = 0.450 f_S$
(7) $f_{III}/f_{III1} = 0.691$
　　$f_{III}/f_{III2} = 0.620$
(8) $d_{17} = 0.214 f_S$
　　$d_{19} = 0.253 f_S$
$\Sigma d + f_B = 147.8$

EXAMPLE 3

$F_{NO} = 1:3.8-4.6-5.7$
$f = 72.27-135.00-203.50$
$\omega = 17.0-8.9-5.9$
$f_B = 38.49-51.51-67.56$

| Surface No. | $r_j$ | $d_j$ | $n_i$ | $\nu_i$ |
|---|---|---|---|---|
| 1 | 76.639 | 6.03 | 1.48749 | 70.2 |
| 2 | −294.907 | 0.10 | | |
| 3 | 61.864 | 2.35 | 1.80518 | 25.4 |
| 4 | 42.900 | 0.16 | | |
| 5 | 44.250 | 4.79 | 1.49700 | 81.6 |
| 6 | 110.000 | 2.45-20.98-27.29 | | |
| 7 | −245.000 | 1.28 | 1.77250 | 49.6 |
| 8 | 33.299 | 2.30 | 1.72151 | 29.2 |
| 9 | 64.350 | 2.73 | | |
| 10 | −42.900 | 1.28 | 1.77250 | 49.6 |
| 11 | 37.714 | 3.78 | 1.80518 | 25.4 |
| 12 | −859.147 | 21.28-8.85-0.70 | | |
| 13 | 152.240 | 3.52 | 1.74320 | 49.3 |
| 14 | −60.691 | 0.10 | | |
| 15 | 35.349 | 7.60 | 1.48749 | 70.2 |
| 16 | −32.725 | 1.29 | 1.80518 | 25.4 |
| 17 | 378.000 | 16.64 | | |
| 18 | 199.140 | 3.72 | 1.62004 | 36.3 |
| 19 | −43.709 | 18.80 | | |
| 20 | −23.205 | 1.28 | 1.77250 | 49.6 |
| 21 | 2539.340 | 2.55 | 1.59270 | 35.3 |
| 22 | −59.550 | | | |

(1) $f_I/f_S = 1.468$
(2) $|f_{II}|/f_S = 0.420$
(3) $f_{III}/f_S = 0.460$
(4) $(\nu_1 + \nu_3)/2 = 72.85, \nu_2 = 25.4$
(5) $(n_4 + n_5 + n_6 + n_7)/4 = 1.768$
(6) $r_8 = 0.461 f_S$
　　$r_{11} = 0.522 f_S$
(7) $f_{III}/f_{III1} = 0.692$
　　$f_{III}/f_{III2} = 0.571$
(8) $d_{17} = 0.230 f_S$
　　$d_{19} = 0.260 f_S$
$\Sigma d + f_B = 142.52$

EXAMPLE 4

$F_{NO} = 1:3.8-4.6-5.7$
$f = 72.30-135.01-203.55$
$\omega = 17.0-8.9-5.9$
$f_B = 39.62-53.92-71.27$

| Surface No. | $r_j$ | $d_j$ | $n_i$ | $\nu_i$ |
|---|---|---|---|---|
| 1 | 78.946 | 5.94 | 1.48749 | 70.2 |
| 2 | −271.287 | 0.10 | | |
| 3 | 65.758 | 2.40 | 1.80518 | 25.4 |
| 4 | 44.808 | 0.13 | | |
| 5 | 45.866 | 5.30 | 1.49700 | 81.6 |
| 6 | 125.800 | 2.39-19.61-25.48 | | |

-continued

| | | | | |
|---|---|---|---|---|
| 7 | −203.165 | 1.30 | 1.77250 | 49.6 |
| 8 | 35.725 | 2.36 | 1.72151 | 29.2 |
| 9 | 69.055 | 2.74 | | |
| 10 | −43.578 | 1.30 | 1.77250 | 49.6 |
| 11 | 35.563 | 4.00 | 1.80518 | 25.4 |
| 12 | −1963.060 | 21.02-8.49-0.55 | | |
| 13 | 198.858 | 3.69 | 1.74320 | 49.3 |
| 14 | −54.471 | 0.10 | | |
| 15 | 30.215 | 7.80 | 1.48749 | 70.2 |
| 16 | −38.083 | 1.30 | 1.80518 | 25.4 |
| 17 | 140.638 | 20.34 | | |

I claim:

1. In a compact zoom lens system which comprises, in order from the object side, a first lens unit having a positive refractive power, a second lens unit having a negative refractive power, and a third lens unit having a positive refractive power, the improvement wherein said first lens unit comprises a positive, a negative and a positive lens element, said second lens unit comprising two cemented negative lenses, each of which comprises a negative lens element on the object side cemented to a positive lens element, and said third lens unit comprising a front sub-unit comprising a positive lens element and a cemented positive lens comprising a positive lens element on the object side cemented to a negative lens element, an intermediate sub-unit consisting solely of a positive lens element and a rear sub-unit consisting solely of a cemented negative meniscus lens comprising a negative lens elements on the object side cemented to a positive lens element and which has a convex surface on the image side, said lens system further satisfying the following conditions:

$$1.3 < f_I/f_S < 1.5 \quad (1)$$

$$0.37 < |f_{II}|/f_S < 0.45 \quad (2)$$

$$0.4 < f_{III}/f_S < 0.5 \quad (3)$$

$$(\nu_1 + \nu_3)/2 > 70, \nu_2 < 40 \quad (4)$$

$$(n_4 + n_5 + n_6 + n_7)/4 > 1.73 \quad (5)$$

$$0.4 f_S < r_8 < 0.7 f_S \quad (6)$$

$$0.4 f_S < r_{11} < 0.6 f_S$$

$$0.6 < f_{III}/f_{III1} < 0.8 \quad (7)$$

$$0.5 < f_{III}/f_{III2} < 0.7$$

$$0.1 f_S < d_{17} < 0.35 f_S \quad (8)$$

$$0.1 f_S < d_{19} < 0.35 f_S$$

where
$f_S$: focal length of the overall system at the wide-angle end
$f_I$: focal length of the first lens unit
$f_{II}$: focal length of the second lens unit
$f_{III}$: focal length of the third lens unit
$\nu_i$: Abbe number of the ith lens element counted from the object side
$n_i$: refractive index at the d line of an ith lens element counted from the object side
$r_j$: radius of curvature of a jth lens element counted from the object side
$f_{III1}$: focal length of the front sub-unit in the third lens unit
$f_{III2}$: focal length of the intermediate sub-unit in the third lens unit
$d_j$: distance between a jth surface and a (j+1) surface as counted from the object side.

2. The lens system according to claim 1, further satisfying the following conditions:

$F_{NO} = 1:3.9-4.7-5.7$
$f = 72.30-135.00-203.49$
$\omega = 17.1-8.9-5.9$
$f_B = 39.88-51.88-68.36$

| Surface No. | $r_j$ | $d_j$ | $n_i$ | $\nu_i$ |
|---|---|---|---|---|
| 1 | 80.080 | 4.59 | 1.48749 | 70.2 |
| 2 | 1080.030 | 0.10 | | |
| 3 | 85.000 | 2.20 | 1.80518 | 25.4 |
| 4 | 53.500 | 0.15 | | |
| 5 | 55.555 | 6.03 | 1.49700 | 81.6 |
| 6 | −533.185 | 2.00-20.86-26.67 | | |
| 7 | −146.228 | 1.28 | 1.77250 | 49.6 |
| 8 | 38.421 | 2.11 | 1.80518 | 25.4 |
| 9 | 68.597 | 2.56 | | |
| 10 | −50.310 | 1.28 | 1.74320 | 49.3 |
| 11 | 32.535 | 3.86 | 1.80518 | 25.4 |
| 12 | 267.123 | 21.39-8.92-0.69 | | |
| 13 | 132.321 | 3.60 | 1.74320 | 49.3 |
| 14 | −62.800 | 0.10 | | |
| 15 | 31.787 | 7.76 | 1.48749 | 70.2 |
| 16 | −35.190 | 1.29 | 1.80518 | 25.4 |
| 17 | 152.991 | 17.05 | | |
| 18 | 128.547 | 3.71 | 1.64769 | 33.8 |
| 19 | −47.616 | 17.29 | | |
| 20 | −23.000 | 1.20 | 1.78590 | 44.2 |
| 21 | 296.503 | 3.00 | 1.59270 | 35.3 |
| 22 | −60.960 | | | |

(1) $f_I/f_S = 1.394$
(2) $|f_{II}|/f_S = 0.417$
(3) $f_{III}/f_S = 0.459$
(4) $(\nu_1 - \nu_3)/2 = 75.9, \nu_2 = 25.4$
(5) $(n_4 + n_5 + n_6 + n_7)/4 = 1.782$
(6) $r_8 = 0.531 f_S$
   $r_{11} = 0.450 f_S$
(7) $f_{III}/f_{III1} = 0.692$
   $f_{III}/f_{III2} = 0.613$
(8) $d_{17} = 0.236 f_S$
   $d_{19} = 0.239 f_S$
$\Sigma d + f_B = 142.43$ 3. The lens system according to claim 1, further satisfying the following conditions:

$F_{NO} = 1:3.9-4.6-5.7$
$f = 72.30-135.00-203.49$
$\omega = 17.1-8.9-6.0$
$f_B = 39.83-52.66-69.37$

| Surface No. | $r_j$ | $d_j$ | $n_i$ | $\nu_i$ |
|---|---|---|---|---|
| 1 | 79.747 | 4.68 | 1.51633 | 64.1 |
| 2 | 2653.075 | 0.10 | | |
| 3 | 86.590 | 2.20 | 1.80518 | 25.4 |
| 4 | 52.481 | 0.15 | | |
| 5 | 54.250 | 5.92 | 1.49700 | 81.6 |
| 6 | −834.174 | 2.20-19.98-25.73 | | |
| 7 | −152.136 | 1.28 | 1.69680 | 55.5 |
| 8 | 30.736 | 2.42 | 1.76182 | 26.6 |
| 9 | 58.137 | 2.73 | | |
| 10 | −50.300 | 1.28 | 1.74400 | 44.7 |
| 11 | 32.541 | 3.82 | 1.80518 | 25.4 |
| 12 | 249.746 | 22.86-9.53-0.74 | | |
| 13 | 139.013 | 3.60 | 1.71700 | 47.9 |
| 14 | −61.471 | 0.10 | | |
| 15 | 32.471 | 7.69 | 1.48749 | 70.2 |
| 16 | −35.678 | 1.28 | 1.80518 | 25.4 |
| 17 | 147.367 | 15.49 | | |
| 18 | 142.098 | 6.53 | 1.64769 | 33.8 |
| 19 | −48.220 | 18.32 | | |
| 20 | −23.741 | 1.20 | 1.78590 | 44.2 |
| 21 | 457.998 | 4.12 | 1.59270 | 35.3 |

-continued

| 22 | −54.776 | | | |

(1) $f_I/f_S = 1.383$
(2) $|f_{II}|/f_S = 0.421$
(3) $f_{III}/f_S = 0.483$
(4) $(\nu_1 + \nu_3)/2 = 72.85$, $\nu_2 = 25.4$
(5) $(n_4 + n_5 + n_6 + n_7)/4 = 1.752$
(6) $r_8 = 0.425 f_S$
   $r_{11} = 0.450 f_S$
(7) $f_{III}/f_{III1} = 0.691$
   $f_{III}/f_{III2} = 0.620$
(8) $d_{17} = 0.214 f_S$
   $d_{19} = 0.253 f_S$
$\Sigma d + f_B = 147.8$ 4. The lens system according to claim 1, further satisfying the following conditions:

$F_{NO} = 1:3.8-4.6-5.7$
$f = 72.27-135.00-203.50$
$\omega = 17.0-8.9-5.9$
$f_B = 38.49-51.51-67.56$

| Surface No. | $r_j$ | $d_j$ | $n_i$ | $\nu_i$ |
|---|---|---|---|---|
| 1 | 76.639 | 6.03 | 1.48749 | 70.2 |
| 2 | −294.907 | 0.10 | | |
| 3 | 61.864 | 2.35 | 1.80518 | 25.4 |
| 4 | 42.900 | 0.16 | | |
| 5 | 44.250 | 4.79 | 1.49700 | 81.6 |
| 6 | 110.000 | 2.45−20.98−27.29 | | |
| 7 | −245.000 | 1.28 | 1.77250 | 49.6 |
| 8 | 33.299 | 2.30 | 1.72151 | 29.2 |
| 9 | 64.350 | 2.73 | | |
| 10 | −42.900 | 1.28 | 1.77250 | 49.6 |
| 11 | 37.714 | 3.78 | 1.80518 | 25.4 |
| 12 | −859.147 | 21.28−8.85−0.70 | | |
| 13 | 152.240 | 3.52 | 1.74320 | 49.3 |
| 14 | −60.691 | 0.10 | | |
| 15 | 35.349 | 7.60 | 1.48749 | 70.2 |
| 16 | −32.725 | 1.29 | 1.80518 | 25.4 |
| 17 | 378.000 | 16.64 | | |
| 18 | 199.140 | 3.72 | 1.62004 | 36.3 |
| 19 | −43.709 | 18.80 | | |
| 20 | −23.205 | 1.28 | 1.77250 | 49.6 |
| 21 | 2539.340 | 2.55 | 1.59270 | 35.3 |
| 22 | −59.550 | | | |

(1) $f_I/f_S = 1.468$
(2) $|f_{II}|/f_S = 0.420$
(3) $f_{III}/f_S = 0.460$
(4) $(\nu_1 + \nu_3)/2 = 72.85$, $\nu_2 = 25.4$
(5) $(n_4 + n_5 + n_6 + n_7)/4 = 1.768$
(6) $r_8 = 0.461 f_S$
   $r_{11} = 0.522 f_S$
(7) $f_{III}/f_{III1} = 0.692$
   $f_{III}/f_{III2} = 0.571$
(8) $d_{17} = 0.230 f_S$
   $d_{19} = 0.260 f_S$
$\Sigma d + f_B = 142.52$ 5. The lens system according to claim 1, further satisfying the following conditions:

$F_{NO} = 1:3.8-4.6-5.7$
$f = 72.30-135.01-203.55$
$\omega = 17.0-8.9-5.9$
$f_B = 39.62-53.92-71.27$

| Surface No. | $r_j$ | $d_j$ | $n_i$ | $\nu_i$ |
|---|---|---|---|---|
| 1 | 78.946 | 5.94 | 1.48749 | 70.2 |
| 2 | −271.287 | 0.10 | | |
| 3 | 65.758 | 2.40 | 1.80518 | 25.4 |
| 4 | 44.808 | 0.13 | | |
| 5 | 45.866 | 5.30 | 1.49700 | 81.6 |
| 6 | 125.800 | 2.39−19.61−25.48 | | |
| 7 | −203.165 | 1.30 | 1.77250 | 49.6 |
| 8 | 35.725 | 2.36 | 1.72151 | 29.2 |
| 9 | 69.055 | 2.74 | | |
| 10 | −43.578 | 1.30 | 1.77250 | 49.6 |
| 11 | 35.563 | 4.00 | 1.80518 | 25.4 |
| 12 | −1963.060 | 21.02−8.49−0.55 | | |
| 13 | 198.858 | 3.69 | 1.74320 | 49.3 |
| 14 | −54.471 | 0.10 | | |
| 15 | 30.215 | 7.80 | 1.48749 | 70.2 |
| 16 | −38.083 | 1.30 | 1.80518 | 25.4 |
| 17 | 140.638 | 20.34 | | |
| 18 | 84.328 | 3.66 | 1.59551 | 39.2 |
| 19 | −45.245 | 13.30 | | |
| 20 | −23.436 | 1.20 | 1.77250 | 49.6 |
| 21 | 147.360 | 2.50 | 1.59270 | 35.3 |
| 22 | −84.362 | | | |

(1) $f_I/f_S = 1.451$
(2) $|f_{II}|/f_S = 0.419$
(3) $f_{III}/f_S = 0.462$
(4) $(\nu_1 + \nu_3)/2 = 75.9$, $\nu_2 = 25.4$
(5) $(n_4 + n_5 + n_6 + n_7)/4 = 1.768$
(6) $r_8 = 0.494 f_S$
   $r_{11} = 0.492 f_S$
(7) $f_{III}/f_{III1} = 0.730$
   $f_{III}/f_{III2} = 0.668$
(8) $d_{17} = 0.281 f_S$
   $d_{19} = 0.184 f_S$
$\Sigma d + f_B = 142.49$

* * * * *